United States Patent
Miyagawa et al.

(10) Patent No.: US 7,418,193 B2
(45) Date of Patent: Aug. 26, 2008

(54) VIDEO RECEIVING AND RECORDING APPARATUS

(75) Inventors: Machiko Miyagawa, Takefu (JP); Toshio Ishimoto, Takefu (JP); Yoshinori Mizushima, Takefu (JP)

(73) Assignee: Orion Electric Company Ltd., Fukui-ken (JP)

( * ) Notice: Subject to any disclaimer, the term of this patent is extended or adjusted under 35 U.S.C. 154(b) by 907 days.

(21) Appl. No.: 10/957,731

(22) Filed: Oct. 5, 2004

(65) Prior Publication Data

US 2005/0089304 A1   Apr. 28, 2005

(30) Foreign Application Priority Data

Oct. 22, 2003  (JP) ............... 2003-362445

(51) Int. Cl.
H04N 5/91 (2006.01)
(52) U.S. Cl. .............. 386/124; 386/111; 386/112; 386/46; 386/101; 725/109
(58) Field of Classification Search ........ 386/112, 386/111, 46, 124, 109
See application file for complete search history.

(56) References Cited

U.S. PATENT DOCUMENTS

| | | | | |
|---|---|---|---|---|
| 5,689,496 A | * | 11/1997 | Amano | 369/275.4 |
| 6,697,567 B1 | * | 2/2004 | Suzuki | 386/111 |
| 7,254,318 B2 | * | 8/2007 | Imada et al. | 386/112 |
| 2008/0069538 A1 | * | 3/2008 | Arai et al. | 386/104 |

FOREIGN PATENT DOCUMENTS

| | | |
|---|---|---|
| JP | 05-176230 | 12/1991 |
| JP | 06-178258 | 12/1992 |
| JP | 06-290510 | 4/1993 |
| JP | 09-083927 | 9/1995 |
| JP | 10-145727 | 11/1996 |
| JP | 2001-145036 | 11/1999 |
| JP | 2002-142165 | 11/2000 |
| JP | 2002-199323 | 12/2000 |

* cited by examiner

*Primary Examiner*—Thai Tran
*Assistant Examiner*—Helen Shibru
(74) *Attorney, Agent, or Firm*—Reed Smith LLP; Stanley P. Fisher, Esq.; Juan Carlos A. Marquez, Esq.

(57) ABSTRACT

A video receiving and recording apparatus which can record a momentarily overlooked scene of a television broadcast and which can realize a reduction in power consumption and the like is provided. This video receiving and recording apparatus includes a short-time simple recording operating means for operating the video receiving and recording apparatus so as to record the momentarily overlooked scene in a recording and reproducing section when a viewer momentarily overlooks the specific scene while the viewer is viewing the television broadcast on a television monitor. The momentarily overlooked scene is recorded only when the short-time simple recording operating means is operated while the video receiving and recording apparatus operates in a short-time simple recording mode. A signal of the television broadcast received by a tuner is processed through an external memory only when the video receiving and recording apparatus operates in the short-time simple recording mode.

6 Claims, 5 Drawing Sheets

$T_1$ (10 SECONDS)    $T_2$ (1 MINUTE)

| RECORDING TIME 1 MINUTE | |
|---|---|
| RETROSPECTIVE RECORDING TIME 10 SECONDS | |
| CATEGORY | SPORTS |
|  | NEWS |
| REPRODUCTION | AFTER RECORDING |
|  | ▶ BY AS MUCH AS RETROSPECTIVE TIME |

VIDEO RECEIVING AND RECORDING APPARATUS

BACKGROUND OF THE INVENTION

1. Field of the Invention

The present invention relates to a video receiving and recording apparatus capable of promptly recording a specific part of a television broadcast in a short time range by a simple operation.

2. Description of the Related Art

A video receiver outputs a television broadcast on a specific channel to a television monitor according to an operation for selecting a television channel by a viewer who uses the receiver. The user can thereby view a specific television broadcast which the viewer desires to view.

The viewer often overlooks a broadcast content while viewing the television broadcast and wants to view the overlooked scene once again. Conventionally, there is proposed a video display apparatus which enables the viewer to view the scene thus momentarily overlooked (see, for example, Japanese Patent Application Laid-Open (JP-A) No. 5-176230).

The apparatus disclosed in JP-A No. 5-176230, however, only enables the viewer to view the overlooked scene again and cannot record the scene. Further, a conventional video recording apparatus, which can record a momentarily overlooked scene of a television broadcast, stores a video and the like received by a tuner in an external memory. The apparatus then outputs the video and the like from the external memory to a television monitor or records the video and the like in a recording medium.

As can be seen, the conventional video recording apparatus, which can record the momentarily overlooked scene of the television broadcast, uses the external memory beyond necessity. This results in an increase in consumption power and a restriction to a life of the apparatus. Besides, the conventional video recording apparatus is slow in response to a viewer's operation, thereby disadvantageously making the viewer feel cumbersome.

SUMMARY OF THE INVENTION

It is, therefore, an object of the present invention to provide a video receiving and recording apparatus which can record a momentarily overlooked scene of a television broadcast, which can reduce power consumption, and which can improve an apparatus life.

According to one aspect of the present invention, there is provided a video receiving and recording apparatus including: a tuner that receives a television broadcast on a specific channel; a television monitor that outputs the received television broadcast; recording means for recording the received television broadcast in a recording medium; an external memory that inputs the received television broadcast from the tuner; and a control section that exercises an operation control, the video receiving and recording apparatus comprising:

short-time simple recording operating means for allowing a viewer of the video receiving and recording apparatus to promptly perform an operation for recording a specific scene of the television broadcast in the recording medium in a short time range while the viewer is viewing the television broadcast; and operation mode setting means for setting the video receiving and recording apparatus in a short-time simple recording mode in which the video receiving and recording apparatus can operate so as to perform short-time simple recording for recording the specific scene of the television broadcast in the short time range according to an operation of the short-time simple recording operating means, wherein the operation mode setting means can determine whether to set the video receiving and recording apparatus in the short-time simple recording mode according to a selection of the viewer, and only when the video receiving and recording apparatus is set in the short-time simple recording mode, a signal of the television broadcast received by the tuner is processed through the external memory; and when the viewer operates the short-time simple recording operating means, the broadcast content, which is output to the television monitor since a time before the viewer operates the short-time simple recording operating means until a time after the viewer operates the short-time simple recording operating means, is recorded in the recording medium in a certain short time range.

According to the video receiving and recording apparatus of the present invention, when the viewer operates the short-time simple recording operating means while the video receiving and recording apparatus operates in the short-time simple recording mode, the video receiving and recording apparatus performs the short-time simple recording. It is thereby possible to record a specific scene which the viewer momentarily overlooks in the television broadcast by the quick operation of the short-time simple recording operating means.

According to the video receiving and recording apparatus of the present invention, for a signal processing such as output of the received television broadcast to the television monitor, only when the video receiving and recording apparatus operates in the short-time simple recording mode, a signal of the received television broadcast is processed through the external memory.

The video receiving and recording apparatus of the present invention thus performs the television broadcast signal processing through the external memory only when the video receiving and recording apparatus operates in the short-time simple recording mode. It is therefore possible to prevent excessive use of the external memory. This can thereby reduce power consumption and improve the life of the apparatus.

Further, the video receiving and recording apparatus can be constituted so that, when the video receiving and recording apparatus is set in the short-time simple recording mode, an indication that the video receiving and recording apparatus is set in the short-time simple recording mode is displayed on the television monitor.

According to the video receiving and recording apparatus of the present invention, when the video receiving and recording apparatus operates in the short-time simple recording mode, the viewer can recognize the state from the display of the television monitor. It is therefore possible to prevent an operation error of operating the short-time simple recording operating means while the user forgets setting the video receiving and recording apparatus in the short-time recording mode. This can ensure that the video receiving and recording apparatus performs the short-time simple recording without any operation error.

Moreover, the indication that the video receiving and recording apparatus is set in the short-time simple recording mode can be displayed by OSD display. Accordingly, when the indication that the video receiving and recording apparatus is set in the short-time simple recording mode is displayed on the television monitor, the viewer can recognize the indication easily and visually.

Furthermore, the operation mode setting means can set a retrospective recording time corresponding to a certain time for recording the broadcast content which is output to the television monitor before the viewer operates the short-time simple recording operating means, and a recording time for recording the broadcast content which is output to the television monitor after the viewer operates the short-time simple recording operating means, in accordance with a viewer's operation. It is thereby possible to set the short time range for executing the short-time simple recording in accordance with the viewer's operation.

The present invention is carried out as stated above and exhibits the following advantages. The video receiving and recording apparatus according to the present invention can record a specific scene which a viewer momentarily overlooks in a television broadcast, and performs a signal processing such as output of the received television broadcast to a television monitor through an external memory only when the video receiving and recording apparatus operates in a short-time simple recording mode in which the video receiving and recording apparatus can perform short-time simple recording according to a viewer's operation. It is thereby possible to prevent excessive use of the external memory, reduce power consumption, and improve the life of the apparatus.

DESCRIPTION OF THE PREFERRED EMBODIMENT

Figure 1:
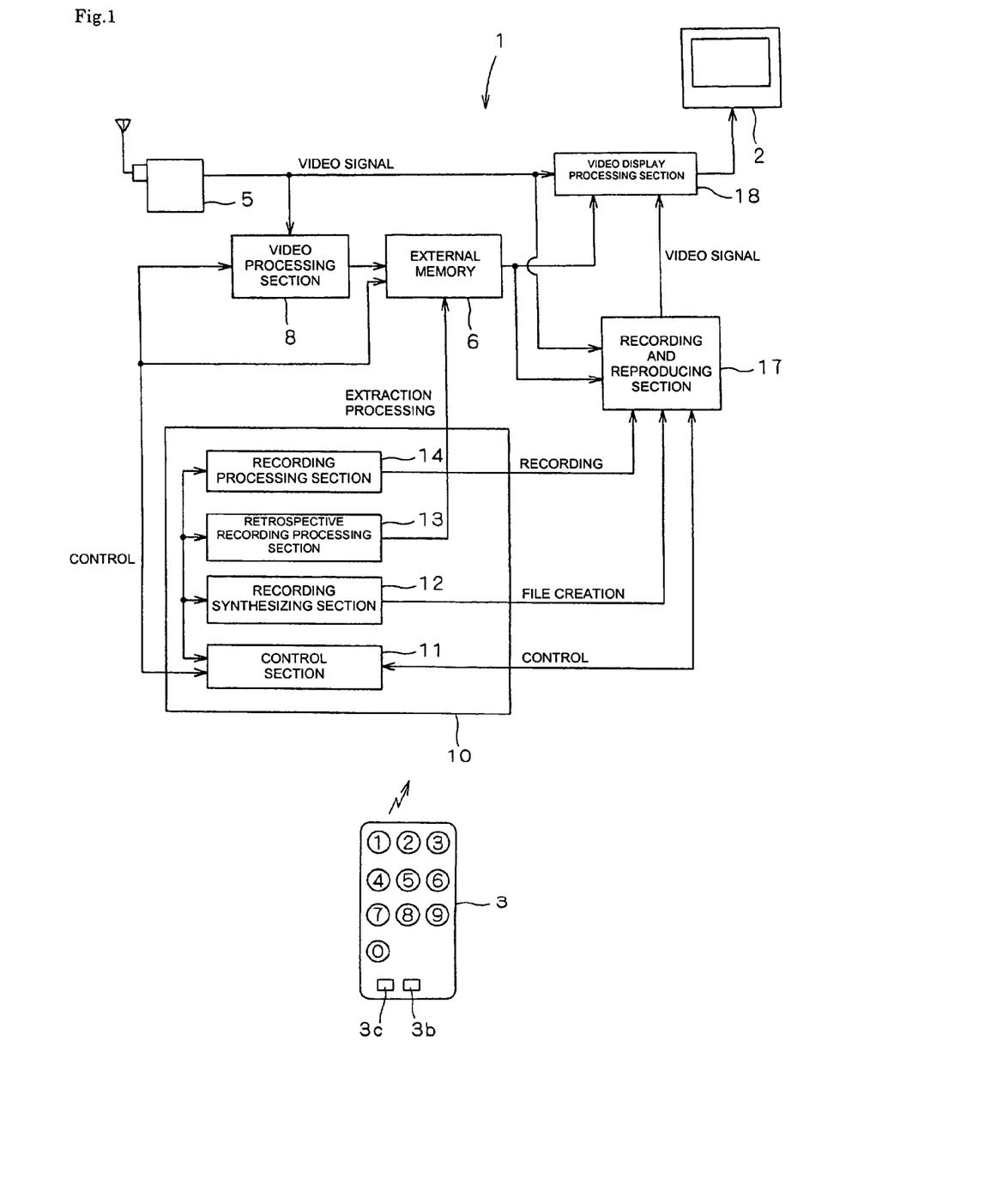
FIG. 1 is a block diagram of a video receiving and recording apparatus according to one embodiment of the present invention.

An embodiment of the present invention will be described hereinafter with reference to FIGS. 1 to 6. FIG. 1 is a block diagram of a video receiving and recording apparatus 1 according to one embodiment of the present invention, which shows a schematic configuration of the video receiving and recording apparatus 1.

The video receiving and recording apparatus 1 includes an operation remote controller 3, a tuner 5, a control microcomputer 10, a video processing section 8, an external memory 6, a recording and reproducing section 17, and a television monitor 2. A viewer who uses this video receiving and recording apparatus 1 (hereinafter, also referred to as "user" of the video receiving and recording apparatus 1) operates the operation remote controller 3, whereby the user can operate the video receiving and recording apparatus 1.

The operation remote controller 3 includes various operation keys for operating the video receiving and recording apparatus 1. Specifically, the operation remote controller 3 includes a power key, number keys, an operation menu display key 3b, and a brief recording key 3c as well as various other keys necessary to operate the video receiving and recording apparatus 1.

The power key is used to turn on or off the video receiving and recording apparatus 1. The number keys are used to input numeric data to the video receiving and recording apparatus 1. The operation remote controller 3 includes the number keys that represent respective numbers shown in FIG. 1. By operating the number keys, the user can select a specific broadcast channel a television broadcast on which the user is to view.

When the user operates the number keys and selects the specific broadcast channel, data on the selected broadcast channel (a specific frequency allocated to the broadcast channel) is set to the tuner 5 to be described later.

The operation menu display key 3b is an operation key for displaying an operation menu on the television monitor 2. By user's operating the operation menu display key 3b, the operation menu is displayed on the television monitor 2.

The user can set conditions for causing the video receiving and recording apparatus 1 to operate through input of items of conditions to the operation menu displayed on the television monitor 2. The condition items are input to this operation menu by operating the operation menu display key 3b and a required operation key included in the operation remote controller 3.

Furthermore, an operation item for setting the video receiving and recording apparatus 1 into a "brief recording mode" for enabling the video receiving and recording apparatus 1 to execute "brief recording", to be described later, is included in the items on this operation menu.

The "brief recording mode" corresponds to a short-time simple recording mode for enabling the video receiving and recording apparatus 1 to operate so as to record a specific scene of a television broadcast in a short time range according to the operation of the brief recording key 3c.

The operation menu described above corresponds to operation mode setting means that can set the video receiving and recording apparatus 1 into the short-time simple recording mode.

The operation remote controller 3 includes the brief recording key 3c. Therefore, by user's performing an operation for depressing this brief recording key 3c, the video receiving and recording apparatus 1 can perform the "brief recording". Thus the brief recording is performed only by the user's operation for depressing the brief recording key 3c. Accordingly, it is possible to cause the video receiving and recording apparatus 1 to operate so as to promptly perform the "brief recording" by a simple operation.

If performing the "brief recording", the video receiving and recording apparatus 1 can record a television broadcast which is output to the television monitor 2 retrospectively to a certain time before the brief recording key 3c is operated. Namely, the video receiving and recording apparatus 1 can record the television broadcast in a range of a certain short time since the certain time before the brief recording key 3c is operated until a certain time after the brief recording key 3c is operated. The specific scene which is momentarily overlooked while the user is viewing the television broadcast can be recorded.

This "brief recording" corresponds to the short-time simple recording for recording the specific scene of the television broadcast which the user views, in the range of the certain short time. In addition, the brief recording key 3c for performing the "brief recording" corresponds to the short-time simple recording operating means.

The operation remote controller 3 further includes a recording operation key for causing the recording and reproducing section 17, to be described later, to record a broadcast content in the recording medium, and a reproduction operation key for reproducing the broadcast content recorded in the recording medium.

When the user of the video receiving and recording apparatus 1 operates each operation key of the operation remote controller 3, an operation key discrimination signal allocated to the each operation key is output from the operation remote controller 3 and input to a remote controller light receiving section which is not shown.

The operation key discrimination signal input to the remote controller light receiving section is then input to a control section 11 in the control microcomputer 10 through a signal processing path which is not shown. The control section 11 thereby determines which operation key of the operation remote controller 3 is operated and exercises a control corresponding to the user's operation.

An antenna is connected to the tuner 5. The tuner 5 selects a broadcast wave on a broadcast channel to be received and receives the broadcast channel. Data on the broadcast channel selected by the user is set to the tuner 5 by operating the remote controller 3.

When the tuner 5 receives the broadcast channel thus set, a video signal included in a broadcast signal on this broadcast channel is input to a video processing section 8 or a video display processing section 18, to be described later, from the tuner 5.

A voice signal included in the broadcast signal received by the tuner 5 is input to a loudspeaker of the television monitor 2 through the signal processing path which is not shown in FIG. 1.

If the video receiving and recording apparatus 1 operates in the brief recording mode, the video signal in the broadcast signal received by the tuner 5 is input from the tuner 5 to the video processing section 8. If the video receiving and recording apparatus 1 does not operate in the brief recording mode, the video signal is input from the tuner 5 to the video display processing section 18.

The video processing section 8 processes the video signal input from the tuner 5. Specifically, the video processing section 8 performs a processing for converting the video signal in an analog form into a video signal in a digital form. The video processing section 8 is also designed to be able to perform a processing for compressing the input video signal if it is necessary to do so. The video processing section 8 then outputs the processed video signal to the external memory 6 to be described later.

The external memory 6 is connected to the control microcomputer 10 to be described later. The external memory 6 is constituted to be able to be read and written by the control microcomputer 10. This external memory 6 can be composed by an E2PROM.

The external memory 6 stores the video signal input from the video processing section 8. If the video receiving and recording apparatus 1 receives a television broadcast, operates to output the received television broadcast to the television monitor 2, and operates in the brief recording mode, the same video signal as that stored in the external memory 6 is output to the video display processing section 18.

The video signal stored in the external memory 6 is input to the recording and reproducing section 17 according to control operations performed by a retrospective recording processing section 13 and a recording processing section 14 to be described later.

The control microcomputer 10 controls entirety of the video receiving and recording apparatus 1. The control microcomputer 10 includes a central processing unit (CPU), a read only memory (ROM), and a random access memory (RAM).

The control section 11, the recording processing section 14, the retrospective recording processing section 13, and a recording synthesizing section 12 are formed in the control microcomputer 10. These respective sections formed in the control microcomputer 10 are modularized by a program stored in the ROM and capable of operational processing.

The control section 11 controls operations performed by the control microcomputer 10. By allowing the control section 11 to control the respective sections of the control microcomputer 10, the control microcomputer 10 controls operations performed by the video receiving and recording apparatus 1.

A control program composed of procedures for controlling the video receiving and recording apparatus 1 is stored in the ROM of the control microcomputer 10. By executing this control program, the control microcomputer 10 controls the video receiving and recording apparatus 1.

The recording processing section 14 controls operations performed by the recording and reproducing section 17 when the video receiving and recording apparatus 1 executes the "brief recording". Namely, the recording processing section 14 controls the recording and reproducing section 17, to be described later, to record a broadcast content in the recording medium when the brief recording key 3c of the operation remote controller 3 is operated while the video receiving and recording apparatus 1 is set in the brief recording mode. The recording processing section 14 outputs an operation control signal for controlling the recording and reproducing section 17 to perform a recording operation when the brief recording key 3c is operated.

Recording time for recording the television broadcast which is output to the television monitor 2 after the brief recording key 3c is operated by the control processing of the recording processing section 14 is set as one item for "brief recording" in items on the operation menu to be described later.

The retrospective recording processing section 13 performs a control processing for extracting a broadcast content which is stored in the external memory 6 before the brief recording key 3c is operated, and which is to be a subject for the "brief recording".

More specifically, the retrospective recording processing section 13 performs the control processing for controlling the external memory 6 to extract the broadcast content which is stored in the external memory 6 since the certain time before the brief recording key 3c is operated until the brief recording key 3c is operated, from the broadcast content stored in the external memory 6, when the brief recording key 3c is operated while the video receiving and recording apparatus 1 is set in the brief recording mode.

The retrospective recording processing section 13 outputs an operation control signal for controlling the external memory 6 to extract the broadcast content which is stored since the certain time before the brief recording key 3c is operated until the brief recording key 3c is operated, to the external memory 6, when the brief recording key 3c is operated.

In addition, the retrospective recording processing section 13 controls the external memory 6 to output this extracted broadcast content to the recording and reproducing section 17 when the broadcast content is extracted from the contents stored in the external memory 6. The extracted broadcast content is recorded in the recording medium.

The certain time before the brief recording key 3c is operated, based on which time the broadcast content is extracted from those stored in the external memory 6 by the processing performed by the retrospective recording processing section 13, is set as one item for the "brief recording" in the items on the operation menu to be described later.

The recording synthesizing section 12 performs a processing for synthesizing the contents recorded in the recording medium in response to one operation of the brief recording key 3c, into one file. Namely, the recording synthesizing section 12 performs a control operation for synthesizing, into one file, a part of the broadcast content recorded in the recording medium by the control processing performed by the retrospective recording processing section 13 with a part of the broadcast content recorded in the recording medium after the brief recording key 3c is operated by the control processing performed by the recording processing section 14. The recording synthesizing section 12 outputs an operation control signal for controlling the recording and reproducing section 17 to operate so as to synthesize the contents recorded in the recording medium in response to one operation of the brief recording key 3c into one file.

The recording and reproducing section 17 performs an operation for recording the input broadcast content in the recording medium, which is not shown, or an operation for reproducing the content recorded in the recording medium. When the content recorded in the recording medium by the recording and reproducing section 17 is reproduced, a video signal corresponding to the reproduced content is output to the video display processing section 18 and then the reproduced content is output to the television monitor 2.

The recording and reproducing section 17 in an arbitrary form among those using a digital versatile disk (DVD), a hard disk (HD), a videotape, and the like is available as long as the recording and reproducing section 17 can record and reproduce the broadcast content in and from the recording medium for recording video and voice.

The video display processing section 18 performs processings for outputting the input video signal to the television monitor 2 as video. The video display processing section 18 includes a color signal processing circuit that includes a chroma IC and a deflection circuit. This video display processing section 18 performs processes such as a horizontal scan, a vertical scan, a luminance control, and a color control based on the input video signal so as to display the video on the television monitor 2.

If the video receiving and recording apparatus 1 receives a television broadcast, outputs the television broadcast to the television monitor 2, and is set in the brief recording mode, the video signal is input from the external memory 6 to the video display processing section 18.

If the recording and reproducing section 17 reproduces the content recorded in the recording medium, the video signal is input from the recording and reproducing section 17 to the video display processing section 18.

Figure 2:
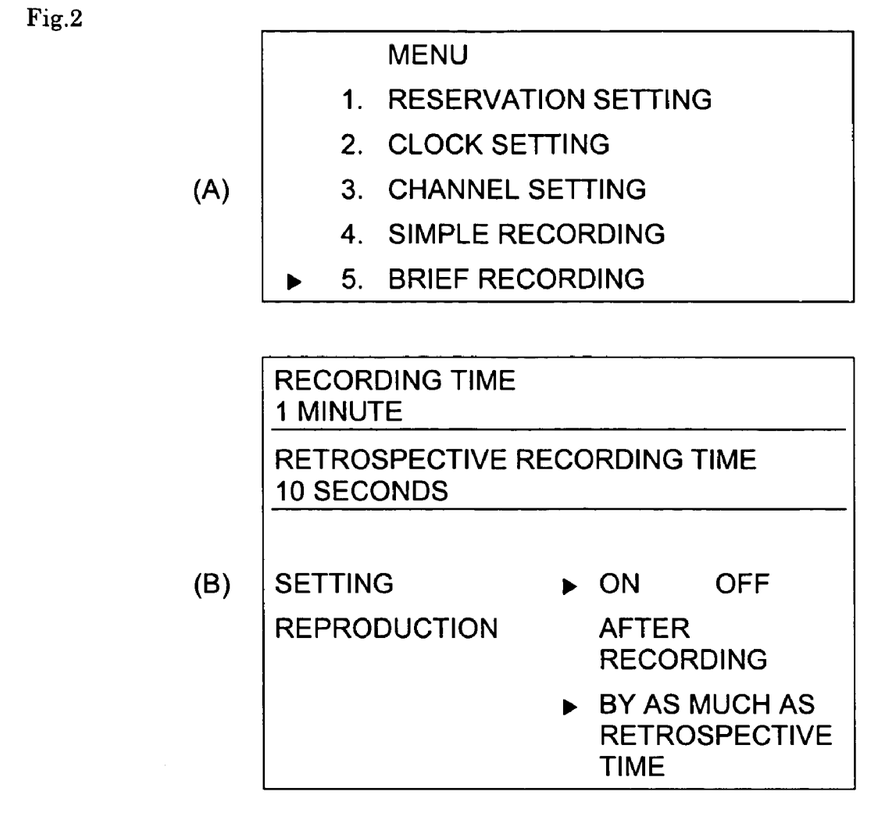
FIGS. 2A and 2B depict examples of operation menus for setting the video receiving and recording apparatus in a short-time simple recording mode.

An example of an operation for setting the video receiving and recording apparatus 1 so that the video receiving and recording apparatus 1 operates in the short-time simple recording mode will next be described with reference to FIGS. 2A to 4. FIGS. 2A and 2B depict one example of the operation menu displayed on the television monitor 2.

FIG. 2A shows an example in which "1. Reservation setting", "2. Clock setting", "3. Channel setting", "4. Simple recording", and "5. Brief recording" are displayed on the television monitor 2 as the items of the operation menu. The "5. Brief recording" item shown in FIG. 2A is an item for setting conditions for causing the video receiving and recording apparatus 1 to operate in the brief-recording mode.

When the user selects the "5. Brief recording" item from among the items of the operation menu as shown in FIG. 2A, a menu for setting specific conditions for performing the "brief recording" is displayed on the television monitor 2 as shown in FIG. 2B.

In the example shown in FIG. 2B, as the conditions for the "brief recording", "recording time" and "retrospective recording time" can be set. In addition, in the example of FIG. 2B, whether to cause the video receiving and recording apparatus 1 to operate in the brief-recording mode can be set by selecting "ON" or "OFF". Further, in the example of FIG. 2B, after the "brief recording" is executed, conditions for reproducing the broadcast content recorded by the "brief recording" can be selected according to items for "reproduction".

Figure 3:
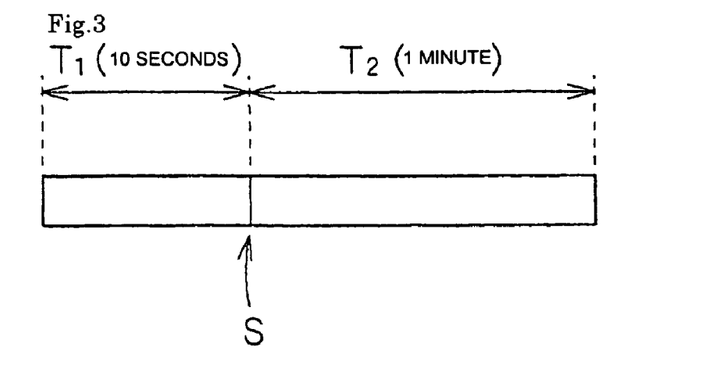
FIG. 3 depicts a relationship between a user's operation timing for performing short-time simple recording and a range of time for the short-time simple recording.

In the example of FIG. 2B, the "recording time" is set at one minute and the "retrospective recording time" is set at ten seconds. The "recording time" and the "retrospective recording time" shown in FIG. 2B will be described while referring to FIG. 3 as well as FIG. 2B. FIG. 3 depicts a relationship among the retrospective recording time (T1), the recording time (T2), and a timing (S) at which the brief recording key 3c is operated.

The retrospective recording time (T1) is the certain time (ten seconds) for the video receiving and recording apparatus 1 to go back retrospectively so as to record the television broadcast output to the television monitor 2 before the timing (S) at which the brief recording key 3c is operated. The recording time (T2) is a certain time for the video receiving and recording apparatus 1 to record the television broadcast to be output to the television monitor 2 after the timing (S) at which the brief recording key 3c is operated.

As can be seen from FIG. 3, by executing the "brief recording", the television broadcast is recorded by as much as a total time (T1+T2) of the time (T1) before the timing (S), at which the user operates the brief recording key 3c, and the time (T2) after the timing (S), and a specific scene of the television broadcast is thereby recorded in the range of the certain short time (T1+T2).

The retrospective recording time (T1) is set in a range of ten seconds or more and five minutes or less. It is particularly preferable to be able to select the retrospective recording time in a range of one minute or more and five minutes or less.

The recording time (T2) is set in a range of one minute or more and five minutes or less. It is particularly preferable to be able to select the recording time (T2) in a range of two minutes or more and three minutes or less.

In the example of FIG. 2B, as the conditions for reproducing the television broadcast recorded by the "brief recording", "After recording" and "By as much as retrospective time" are selected.

If the "After recording" item is selected from among the reproduction conditions shown in FIG. 2B, all ranges of the television broadcast recorded by the "brief recording", that is, the ranges corresponding to the time (T1+T2) are reproduced. If the "By as much as retrospective time" item is selected, only the range of the television broadcast corresponding to the television broadcast recorded retrospectively from the timing (S) at which the brief-recording key 3c is operated, that is, only the range corresponding to the time (T1) is reproduced. In FIG. 2B, the example of selecting the "By as much as retrospective time" item as the reproduction condition is shown.

Further, after selecting the "5. Brief recording" item from among those shown in FIG. 2A, a menu for setting more specific conditions can be also displayed as shown in FIG. 4.

Figure 4:
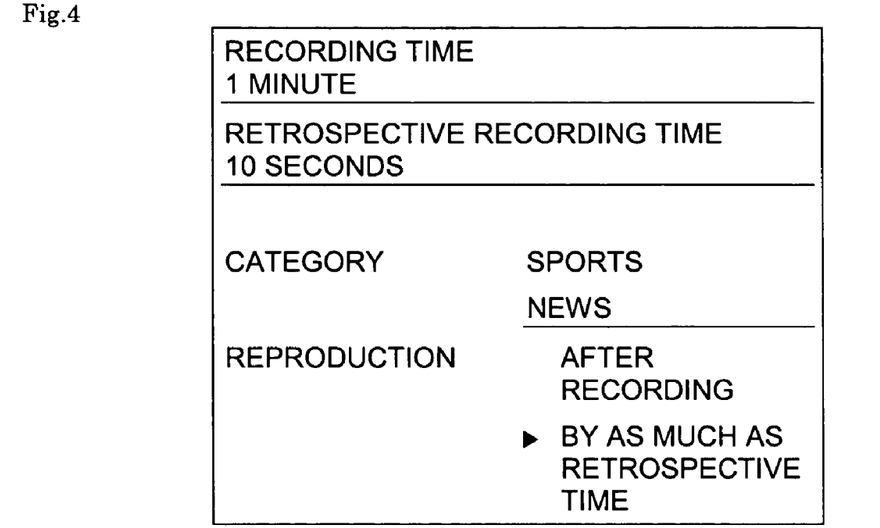
FIG. 4 depicts one example of an operation menu for setting the video receiving and recording apparatus in the short-time simple recording mode.

FIG. 4 depicts one example of the operation menu for setting the specific conditions for the "brief recording", which differs from the example of the operation menu shown in FIG. 2B.

In the example shown in FIG. 4, the "recording time" and the "retrospective recording time" can be set. In addition, conditions for reproducing the recorded content can be set by "reproduction". In the example of FIG. 4, the "recording time" is set at one minute and the "retrospective recording time" is set at ten seconds. Further, the "By as much as retrospective time" item is selected as the reproduction condition.

In the example of FIG. 4, subjects of television broadcast for the "brief recording" can be selected according to "Category". Specifically, "Sports" and "News" are selected as the "Category" in the example of FIG. 4. As a result, the subjects for the "brief recording" are limited to sports programs and news programs.

When the subjects for the "brief recording" are set according to this "Category", the video receiving and recording apparatus 1 executes the "brief recording" only if one of the selected subject programs thus set is output to the television monitor 2.

For example, as shown in FIG. 4, when "Sports" and "News" are selected as "Category", the video receiving and recording apparatus 1 executes the "brief recording" only if the program output to the television monitor 2 is a sports program or a news program.

When "Sports" and "News" are selected as "Category" and the program output to the television monitor 2 is other than the sports program and the news program, the video receiving and recording apparatus 1 does not execute the "brief recording" even if the brief recording key 3c is operated while the video receiving and recording apparatus 1 is set in the brief recording mode.

Figure 5:
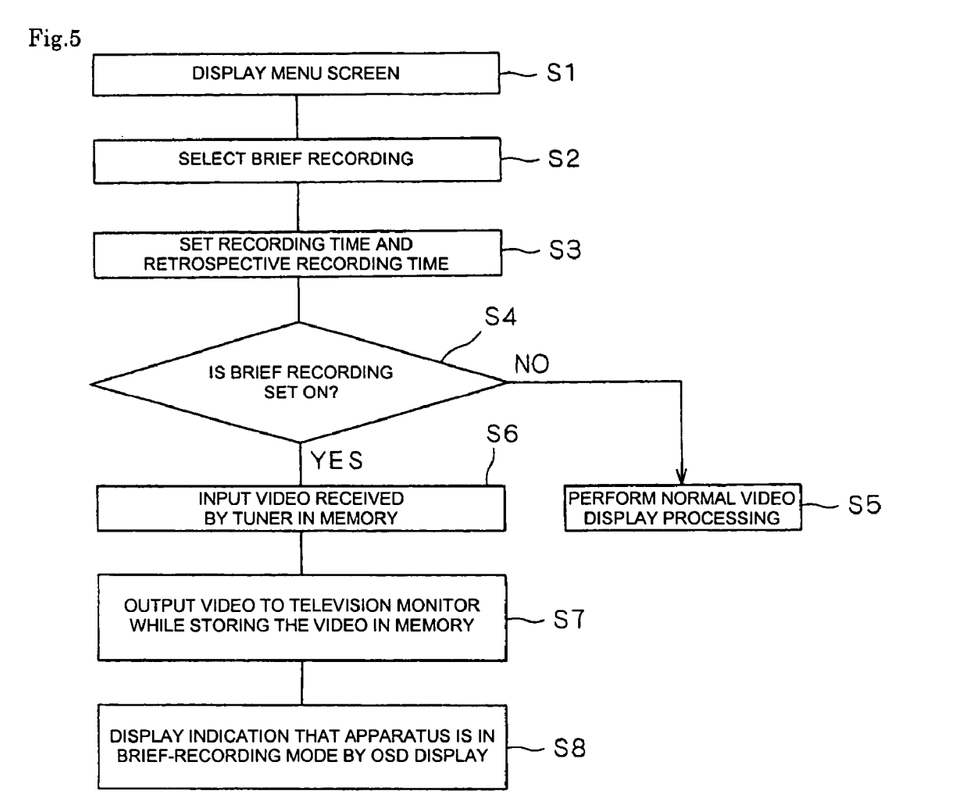
FIG. 5 is a flowchart of one example of procedures for causing the video receiving and recording apparatus to operate.

An example of the operations performed by the video receiving and recording apparatus 1 described thus far will be described with reference to FIG. 5. FIG. 5 is a flowchart of one example of procedures for causing the video receiving and recording apparatus 1 to operate. Specifically, FIG. 5 is the flowchart of procedures for setting the video receiving and recording apparatus 1 in the brief recording mode (short-time simple recording mode), and for causing the video receiving and recording apparatus 1 to operate in this mode.

The video receiving and recording apparatus 1 is turned on, the operation menu display key 3b of the operation remote controller 3 is operated, and a menu screen of the operation menu is displayed on the television monitor 2 (at a step S1). Next, the "5. Brief recording" item is selected from among the items shown on the operation menu (at a step S2). The "recording time" and the "retrospective recording time" are set as described with reference to FIG. 2B (at a step S3).

"ON" or "OFF" of the "brief recording" described with reference to FIG. 2B is selected to thereby set the brief recording to be "ON" or "OFF". If the "brief recording" is set "OFF" ("NO" at a step S4), the video receiving and recording apparatus 1 performs a normal video display processing (at a step S5).

If the video receiving and recording apparatus 1 performs the normal video display processing (at the step S5), the video receiving and recording apparatus 1 is not set in the brief recording mode. In addition, when the television broadcast is output to the television monitor 2, the video signal included in the broadcast signal received by the tuner 5 is directly transmitted to the video display processing section 18.

If the "brief recording" is set "ON" ("YES" at the step S4), the video receiving and recording apparatus 1 is set in the brief recording mode. In addition, the video signal included in the broadcast signal received by the tuner 5 is input to the external memory 6 through the video processing section 8 (at a step S6).

The received television broadcast video is output to the television monitor 2 while storing it in the external memory 6 (at a step S7). Thereafter, an indication of "Brief-recording mode" indicating that the video receiving and recording apparatus 1 is in the brief recording mode is displayed on the television monitor 2 by on-screen display ("OSD display") (at a step S8).

If the indication that the video receiving and recording apparatus 1 operates in the brief recording mode is displayed on the television monitor 2 by the OSD display at the step S8, characters and the like can be clearly displayed on the television monitor 2. This enables the user to recognize the indication that the video receiving and recording apparatus 1 is set in the brief recording mode easily and visually.

Figure 6:
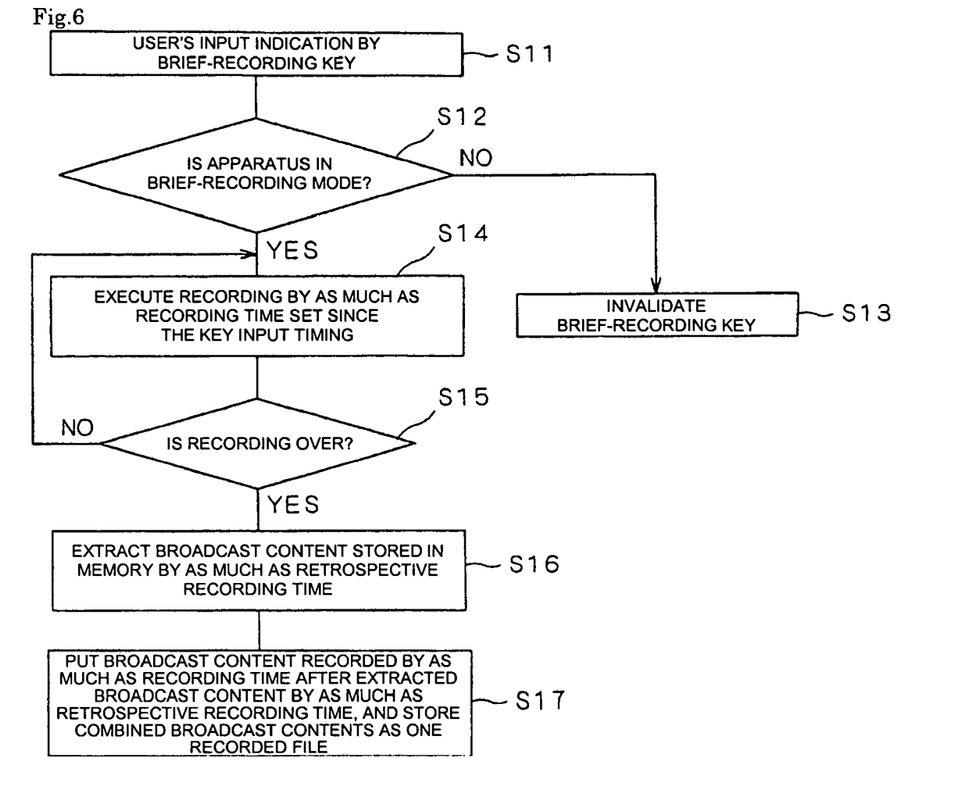
FIG. 6 is a flowchart of another example of procedures for causing the video receiving and recording apparatus to operate.

Another example of the operations performed by the video receiving and recording apparatus 1 will be described with reference to FIG. 6. FIG. 6 is a flowchart of another example of procedures for causing the video receiving and recording apparatus 1 to operate. Specifically, FIG. 6 is the flowchart of procedures for causing the video receiving and recording apparatus 1 to operate so as to execute the "brief recording".

While the video receiving and recording apparatus 1 is receiving a television broadcast on a specific channel and outputting the received television broadcast to the television monitor 2, the user inputs an indication by operating the brief recording key 3c (at a step S11).

It is determined whether the video receiving and recording apparatus 1 is set in the brief recording mode (short-time simple recording mode) (at a step S12). If the video receiving and recording apparatus 1 is not set in the brief recording mode ("NO" at the step S12), a processing for invalidating the input indication by the operation of the brief recording key 3c is performed (at a step S13).

If the video receiving and recording apparatus 1 is set in the brief recording mode ("YES" at the step S12), the video receiving and recording apparatus 1 executes recording the television broadcast in the recording medium by as much as the set recording time since the timing at which the user inputs the indication by the brief recording key 3c (at a step S14). The video receiving and recording apparatus 1 performs recording until finishing recording the television broadcast by as much as the recording time ("NO" at a step S15).

When the video receiving and recording apparatus 1 finishes recording the television broadcast by as much as the recording time ("YES" at the step S15), the broadcast content by as much as the retrospective recording time stored in the external memory 6 is extracted (at a step S16). The broadcast content recorded by as much as the recording time after the brief recording key 3c is operated is combined with and put after the broadcast content by as much as the retrospective recording time extracted from the external memory 6, and the resultant broadcast content is stored as one recorded file (at a step S17).

The example of providing the recording and reproducing section 17 that records and reproduces the broadcast content in and from the recording medium as the means for recording the broadcast content by the "brief recording" has been described for the video receiving and recording apparatus 1. However, it suffices that the video receiving and recording apparatus 1 includes only recording means for recording the broadcast content in the recording medium by the "brief recording" and the video receiving and recording apparatus 1 does not necessarily include reproducing means.

What is claimed is:

1. A video receiving and recording apparatus including: a tuner that receives a television broadcast on a specific channel; a television monitor that outputs the received television broadcast; recording means for recording the received television broadcast in a recording medium; an external memory that inputs the received television broadcast from the tuner; and a control section that exercises an operation control, the video receiving and recording apparatus comprising:

short-time simple recording operating means for allowing a viewer of the video receiving and recording apparatus to promptly perform an operation for recording a specific scene of the television broadcast in said recording medium in a short time range while the viewer is viewing the television broadcast; and operation mode setting means for setting the video receiving and recording apparatus in a short-time simple recording mode in which the video receiving and recording apparatus can operate so as to perform short-time simple recording for recording the specific scene of said television broadcast in the short time range according to an operation of said short-time simple recording operating means, wherein said operation mode setting means can determine whether to set the video receiving and recording apparatus in the short-time simple recording mode according to a selection of the viewer, and only when the video receiving and recording apparatus is set in said short-time simple recording mode, a signal of the television broadcast received by the tuner is processed through the external memory; and when the viewer operates said short-time simple recording operating means, the broadcast content, which is output to the television monitor since a time before the viewer operates said short-time simple recording operating means until a time after the viewer operates said short-time simple recording operating means, is recorded in the recording medium in a certain short time range.

2. The video receiving and recording apparatus according to claim 1, wherein when the video receiving and recording apparatus is set in said short-time simple recording mode, an indication that the video receiving and recording apparatus is set in the short-time simple recording mode is displayed on the television monitor.

3. The video receiving and recording apparatus according to claim 2, wherein the indication that the video receiving and recording apparatus is set in the short-time simple recording mode is displayed by OSD display.

4. The video receiving and recording apparatus according to claim 1, wherein said operation mode setting means can set a retrospective recording time corresponding to a certain time for recording the broadcast content which is output to the television monitor before the viewer operates the short-time simple recording operating means, and a recording time for recording the broadcast content which is output to the television monitor after the viewer operates the short-time simple recording operating means, in accordance with a viewer's operation.

5. The video receiving and recording apparatus according to claim 2, wherein said operation mode setting means can set a retrospective recording time corresponding to a certain time for recording the broadcast content which is output to the television monitor before the viewer operates the short-time simple recording operating means, and a recording time for recording the broadcast content which is output to the television monitor after the viewer operates the short-time simple recording operating means, in accordance with a viewer's operation.

6. The video receiving and recording apparatus according to claim 3, wherein said operation mode setting means can set a retrospective recording time corresponding to a certain time for recording the broadcast content which is output to the television monitor before the viewer operates the short-time simple recording operating means, and a recording time for recording the broadcast content which is output to the television monitor after the viewer operates the short-time simple recording operating means, in accordance with a viewer's operation.

* * * * *